S. G. DEUTLER.

Seed-Planter.

No. 66,308. Patented July 2, 1867.

Witnesses:
Theo. Fuschl.
J. A. Service

Inventor:
S. G. Deutler
Per Munn & Co.
Attys

United States Patent Office.

SOLOMON G. DENTLER, OF ORANGEVILLE, ILLINOIS.

Letters Patent No. 66,308, dated July 2, 1867.

CORN-PLANTER.

The Schedule referred to in these Letters Patent and making part of the same.

TO ALL WHOM IT MAY CONCERN:

Be it known that I, SOLOMON G. DENTLER, of Orangeville, in the county of Stephenson, and State of Illinois, have invented a new and improved Corn-Planter; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
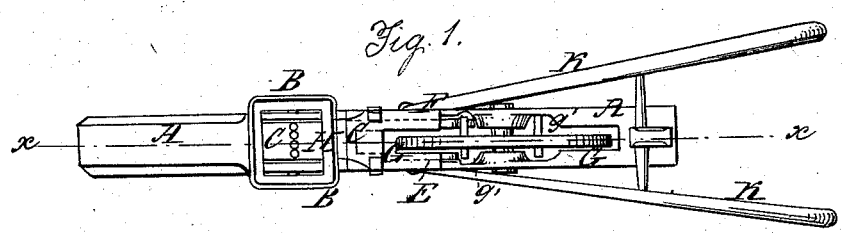
Figure 1 is a top or plan view of my improved machine.
Figure 2:
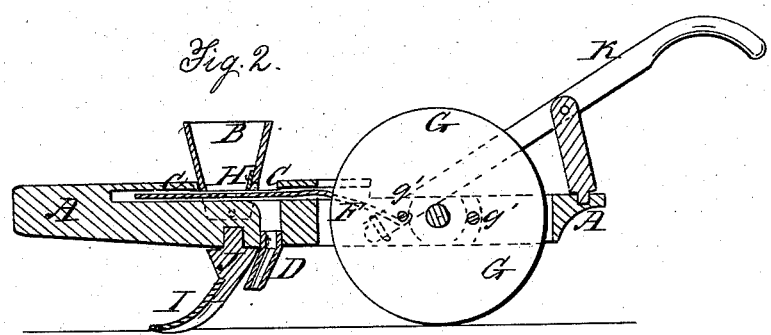
Figure 2 is a vertical longitudinal section of the same taken through the line $x\,x$, fig. 1.

My invention has for its object to furnish an improved machine by means of which the furrow may be opened and the corn dropped and covered easily and accurately; and it consists in the combination of the sliding-valve plate and its arms with the hopper, beam, and operating-wheel, as hereinafter more fully described A is the beam, upon the upper side of which is placed the hopper B, the bottom of which is formed by the plate C, which slides back and forth in a recess or groove upon the upper side of the beam A. The plate C has several holes formed through it of such a size that they will contain sufficient seed to form a single hill. These holes are formed in such a part of the plate C that when the said plate is pushed forward the holes will be within the hopper, and when drawn back they will be directly over the spout D, through which the kernels fall, and by which they are guided in their descent. From one corner of the rear end of the plate C projects a rigid arm, E, the outer end of which is turned up or made broad, and from the other corner of the said rear end of the plate C projects a flexible arm, F, the end of which is turned up or has a hook formed upon it, as shown in fig. 2. G is a wheel, which is pivoted in a slot formed in the rear part of the beam A, and which I prefer to make of such a size that one-half a revolution will measure off the space between two hills of corn. Through the wheel G upon opposite sides of its axis are passed two pins, $g'$, projecting upon both sides of the wheel, and which are placed in such positions that as the wheel revolves the end of the pin upon one side of the wheel will strike against the end of the rigid arm E and push the plate C forward, so that a sufficient number of kernels may enter the holes or valves of the said plate to form a hill. The other end of the pin takes hold of the hooked end of the arm F and draws the plate back, the kernels passing through the spout D to the ground, two hills being thus dropped at each revolution of the wheel G. H is a rubber or other flexible plate attached to the side of the hopper just above the opening through which the plate C moves in and out to prevent any kernels of corn except those in the holes in said plate from passing out, and at the same time to guard against the said kernels being injured by being caught between the side of the hopper and the plate C. I is a shovel-plough, the standard J of which is attached to the under side of the beam A just in front of the spout D, so that the kernels may drop into the open furrow and be covered by the loose soil flowing back into the furrow after the plough has passed. K are the handles, by means of which the planter is guided. The dropping of the seed may be stopped at any time by raising the rear end of the machine so that the wheel G may not be revolved in contact with the surface of the ground. This enables the planter to be turned at the ends of the rows without dropping corn, and to be started in, in such a way that the hills of the succeeding row may be exactly opposite the hills of the preceding one. If desired two of these machines may be connected together so that two rows may be planted at the same time.

I claim as new, and desire to secure by Letters Patent—

The combination of the sliding-valve plate C, having a rigid arm, E, and a flexible arm, F, attached to its rear end, with the hopper B, beam A, and operating-wheel G, substantially as herein shown and described and for the purpose set forth.

SOLOMON G. DENTLER.

Witnesses:
PETER SHECKLER,
PETER LATTIG.